US00RE34062E

United States Patent [19]

Wells

[11] E Patent Number: Re. 34,062

[45] Reissued Date of Patent: Sep. 15, 1992

[54] FABRIC SOFTENING COMPOSITION CONTAINS WATER-INSOLUBLE SURFACTANT AND ALIPHATIC MONO-CARBOXYLIC ACID

[75] Inventor: Martin A. Wells, Higher Bebington, England

[73] Assignee: Lever Brothers Company, New York, N.Y.

[21] Appl. No.: 657,441

[22] Filed: Oct. 3, 1984

Related U.S. Patent Documents

Reissue of:

[64] Patent No.: 4,308,024
Issued: Dec. 29, 1981
Appl. No.: 89,809
Filed: Oct. 31, 1979

[30] Foreign Application Priority Data

Nov. 3, 1978 [GB] United Kingdom ..... 43158/78

[51] Int. Cl.[5] ..... C11D 9/30; D06L 1/12; D06M 13/46; D06M 15/18

[52] U.S. Cl. ..... 8/137; 252/8.6; 252/8.8; 252/117

[58] Field of Search ..... 252/8.6, 8.8; 8/137

[56] References Cited

U.S. PATENT DOCUMENTS

| | | | |
|---|---|---|---|
| 3,325,404 | 6/1967 | Cohen et al. | 252/8.75 |
| 3,497,365 | 2/1970 | Atherton et al. | 106/8 |
| 3,551,168 | 12/1970 | Atherton et al. | 106/8 |
| 3,632,396 | 1/1972 | Perez-Zamora | 252/8.9 |
| 3,714,074 | 1/1973 | Inamorato | 252/528 |
| 3,730,912 | 5/1973 | Inamorato | 252/528 |
| 3,743,534 | 7/1973 | Perez-Zamora | 117/109 |
| 3,756,835 | 9/1973 | Betty et al. | 106/11 |
| 3,915,882 | 10/1975 | Nirischi et al. | 252/131 |
| 3,920,565 | 11/1975 | Morton | 252/8.75 |
| 3,936,537 | 2/1976 | Baskerville et al. | 427/242 |
| 3,954,632 | 5/1976 | Gloss | 252/8.8 |
| 3,993,573 | 11/1976 | Gloss | 252/89 R |
| 4,000,340 | 12/1976 | Murphy et al. | 428/35 |
| 4,113,630 | 9/1978 | Hagner et al. | 252/8.6 |
| 4,126,562 | 11/1978 | Goffinet | 252/8.8 |
| 4,126,586 | 11/1978 | Curtis et al. | 252/524 |
| 4,127,489 | 11/1978 | Pracht et al. | 252/8.8 |
| 4,128,484 | 12/1978 | Barford et al. | 252/809 |
| 4,128,485 | 12/1978 | Bauman et al. | 252/8.8 |
| 4,141,841 | 2/1979 | McDanald | 252/8.8 |
| 4,149,978 | 4/1979 | Goffinet | 252/8.8 |
| 4,151,097 | 4/1979 | Nelson | 252/8.6 |
| 4,308,024 | 12/1981 | Wells | 252/8.6 |
| 4,401,578 | 8/1983 | Verbruggen | 252/8.6 |
| 4,426,299 | 1/1984 | Verbruggen | 252/8.8 |

FOREIGN PATENT DOCUMENTS

| | | |
|---|---|---|
| 1315 | 4/1979 | European Pat. Off. . |
| 74/1725 | 1/1975 | South Africa . |
| 1374419 | 11/1974 | United Kingdom . |
| 1418720 | 12/1975 | United Kingdom . |
| 1428061 | 3/1976 | United Kingdom . |
| 1453093 | 10/1976 | United Kingdom . |
| 1456913 | 12/1976 | United Kingdom . |
| 1482782 | 8/1977 | United Kingdom . |
| 1489527 | 10/1977 | United Kingdom . |
| 1500966 | 2/1978 | United Kingdom . |
| 1519605 | 8/1978 | United Kingdom . |
| 1576325 | 10/1980 | United Kingdom . |

*Primary Examiner*—A. Lionel Clingman
*Attorney, Agent, or Firm*—Pennie & Edmonds

[57] ABSTRACT

The invention relates to the field of fabric softening. It provides for fabric softening compositions comprising a relatively water-insoluble cationic detergent surfactant and a free $C_8$–$C_{24}$ alkyl- or alkenylmonocarboxylic acid. These compositions are significantly more storage stable than compositions, wherein the monocarboxylic is present as a soap. Further inclusion of a relatively water-soluble cationic detergent surfactant or cationic polymer significantly increases the softening performance.

36 Claims, No Drawings

FABRIC SOFTENING COMPOSITION CONTAINS WATER-INSOLUBLE SURFACTANT AND ALIPHATIC MONO-CARBOXYLIC ACID

Matter enclosed in heavy brackets [ ] appears in the original patent but forms no part of this reissue specification; matter printed in italics indicates the additions made by reissue.

The present invention relates to a fabric softening composition and a process for preparing it.

Fabric softening compositions are compositions that are used in the textile and detergent industry to impart a softness or soft feel to textile fabrics, as well as a certain antistatic effect.

In particular in the household laundering operations, fabrics, when washed and dried, may tend to give a certain harsh feel to the skin, and in order to restore or improve the softness of the laundered fabric it has become common usage to treat the laundered fabrics, prior to drying, e.g. in a rinse bath, with so-called fabric softeners, which impart, through different mechanisms, a certain soft feel to the fabrics.

In the art of fabric softeners, a host of materials, compounds and compositions have been proposed. Commercially, however, a very restricted amount of compounds is being used, and thereof the class of cationic detergent surfactants is the commercially important area.

Cationic detergent surfactants, either alone or in admixture with other surfactants, additives, etc. have indeed been proposed and used in the art quite extensively. This is particularly true for quaternary ammonium compounds having two long-chain aliphatic hydrocarbon groups, such as distearyldimethyl ammoniumchloride. Thus, combinations of such cationic detergent surfactants and fatty acid soaps have been proposed in the art, e.g. in British Pat. Specification Nos. 1,456,913 (Proctor & Gamble) and 1,453,093 (Colgate). However, the storage stability of these soap-based systems over longer periods is not optimal for practical purposes, particularly when they contain a certain amount of electrolyte. Furthermore, this prior art describes wide ranges of cationic detergent surfactants and soap, whereas it has been found in the present invention that there are critical fatty acid/cationic ratios, above which the preparation of a stable product becomes very difficult, in not impossible. This critical ratio has been found to be for hardened tallow fatty acids for instance about 0.8/1 (mole ratio). Beyond these critical ratios the products may become undesirably viscous or even inhomogeneous.

The present invention is based in part on the discovery that the above drawbacks can be significantly reduced, and a composition with quite satisfactory softening properties obtained, when using these cationic detergent surfactants in combination with a fatty acid under certain conditions, to be discussed hereafter.

The present invention therefore relates to a fabric softening composition comprising a cationic detergent surfactant having two $C_{12}$–$C_{22}$ alkyl or alkenyl groups, and a fatty acid—the latter being present in a relative proportion of 5–80 mole percent.

The composition may be in any physical form, such as powders, flakes, granules, pellets, marumes, or liquids. Preferably they are in the form of an aqueous liquid.

The amount of cationic detergent surfactant in the composition varies from 20–95 mole %, preferably 40–80 mole %, and the amount of fatty acid varies from 5–80, preferably 10–40 mole %. The total weight of cationic detergent surfactant plus fatty acid is from 2–20% by weight of the total composition.

The cationic detergent surfactant (which is relatively water-insoluble) to be used according to the present invention contains two aliphatic alkyl or alkenyl chains having from 12–22, preferably 16–18 carbon atoms, therein. Typical examples thereof are di(hardened tallow) dimethyl ammoniumchloride and 2-heptadecyl-1-methylstearoyl amido ethyl imidazoline methosulphate. Other suitable examples of such cationic detergent surfactants having two long-chain alkyl groups can be readily found in the art, e.g. in the above-cited patents and in Schwartz-Perry, Vol. II, 1958, "Surface-active Agents and Detergents". Mixtures of two or more of these cationics may also be used. It is to be understood, however, that di(coco)dimethyl ammoniumchloride is not included within the above definition, as this compound is relatively water-soluble.

The fatty acids to be used in the present invention are $C_8$–$C_{24}$ alkyl- or alkenylmonocarboxylic acids, or polymers thereof. Preferably the saturated fatty acids are used, and of these the hardened tallow $C_{16}$–$C_{18}$ fatty acids. Mixtures of various fatty acids may also be used.

Although the above combination produces already a satisfactory softening composition, it has quite unexpectedly been found that a very significant further improvement can be obtained if the above combination further comprises a relatively watersoluble cationic detergent surfactant. Hereby a significant softening advantage is obtained, particularly in the presence of anionic detergents, which may be carried over from the main wash and which may render conventional softeners less effective through complexation.

These ternary compositions are also easier to process than the above binary mixtures, which give viscoelastic products at processing temperatures of about 60°–70° C.

The present invention therefore also relates to (and this is the preferred embodiment) a fabric softening composition comprising a relatively water-insoluble cationic detergent surfactant, a relatively water-soluble cationic detergent surfactant, and a free fatty acid. The amount of the relatively water-soluble cationic detergent surfactant is from 0–50, preferably 5–30 mole %, the other amounts being as indicated above.

Typical examples of relatively water-soluble cationic detergent surfactants are those having only one long-chain alkyl group, such as

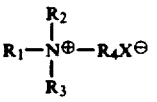

wherein $R_1 = C_{10}$–$C_{24}$, preferably $C_{16}$–$C_{18}$ alkyl or alkenyl group $R_2$, $R_3$ and $R_4$ are each $C_1$–$C_4$, preferably methyl groups and X is a halide or methosulphate.

Other such single long-chain cationic detergent surfactants are cetylbenzyl dimethyl ammoniumchloride, myristoyloxyethyl trimethyl ammoniumiodide, stearoyloxyethyl trimethyl ammoniumchloride, tallow fatty acylcholinechloride, eicosyloxycarbonylmethyl trimethyl ammoniumchloride, stearoylaminoethyl triethyl ammoniumchloride, behenoylaminopropyl trimethyl ammoniumchloride, cetylsulphonylaminoethyl trimethyl ammoniummethosulphate, stearyloxyethylene oxyethyl tripropyl ammoniumchloride, cetylpyridiniumchloride, 3-cetyloxy-2-hydrocypropyl trimethyl ammoniumchloride and 3-behenoyloxy-2-hydrocypropyltrimethyl ammoniumchloride. Di(coco)dimethylammoniumchloride, being relatively water-soluble, is also embraced by the above definition of suitable, relatively water-soluble cationic detergent surfactants.

Other suitable relatively water-soluble cationic detergent surfactants are

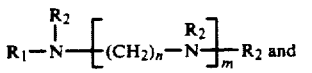

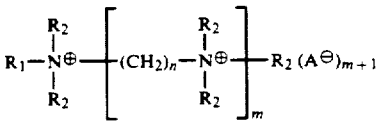

wherein $R_1 = C_{10}$–$C_{24}$, preferably $C_{16}$–$C_{18}$ alkyl or alkenyl group $R_2 = H$ or $(C_2H_4O)_pH$ or $(C_3H_6O)_qH$ or $C_1$–$C_3$ alkyl in which p and q are 0 or a number such that p+q is at most 25, n = a whole number from 2–6, preferably 3, m = a whole number from 1–9, preferably 1–4, $A^{\theta}$ = an anion, preferably a halide or acetate.

Mixtures of the above cationic detergent surfactants may also be used.

Instead of the above, relatively water-soluble cationic detergent surfactants, or in addition thereto, cationic polymers can be used, such as cationic polysaccharide gums, cationic starches or starch derivatives, cationic polyvinyl alcohol or polyvinylpyrrolidone, quaternized dextrans, quaternized hydroethylcellulose, cationic guar gum, copolymers of dialkylamino alkylmethacrylate etc. Suitable preferred examples are cationic guar gum, dextran (M.W. 500,000) substituted with diethylaminoethylgroups to give3.2% N in the molecule, and hydroxyethylcelluose (M.W. 400,000), quaternized with 2,3-epoxypropyltrimethyl ammoniumchloride or 3-chloro 2-hydroxylpropyltrimethyl ammoniumchloride.

The compositions of the invention may furthermore comprise the normal adjuvants, usually present in such compositions. Examples thereof are inorganic salts in minor amounts, such as sodium chloride, solvents such as ethyl- or isopropylalcohol or hexyleneglycol (up to 15%), nonionic surfactants such as condensates of ethylene oxide and/or propylene oxide with fatty alcohols or fatty acids, esters of fatty acids with polyols e.g. glycerolmonostearate, ethoxylated sorbitan esters, in minor amounts (up to 5%), furthermore emulsifiers, perfumes, colourants, germicides, hydrotropes and so on. Clays, such as smectite-type clays, should not be included in any significant amount, as this may cause unstable products. The pH of the composition is 5 or below, or adjusted thereto.

The compositions of the invention may be made in any suitable manner. Preferably, however, the two or three essential ingredients are premixed, heated together until clear and then the molten mixture is added to water with stirring.

The invention will further be illustrated by the following Examples.

EXAMPLES 1–10

Samples 1–10 were made using the following raw materials

| | | |
|---|---|---|
| di(hardened tallow)dimethyl ammonium-chloride | (A) | 75.5% active |
| $C_{10}$-trimethyl ammoniumchloride | (B) | 45.0% active |
| fatty acids mixture, from hardened tallow | (C) | 100% active |

The chain length distributions (in %) of these last two chemicals are:

| | $C_{12}/C_{14}$ | $C_{16}$ | $C_{18}$ | Oleic | $C_{20/22}$ |
|---|---|---|---|---|---|
| $C_{10}$-trimethyl ammonium | — | 6 | 93 | 1 | — |
| fatty acids mixture, from hardened tallow | 4 | 28 | 65 | 2 | 1 |

The hardened tallow alkyl radical in compound A had the above hardened tallow fatty acid distribution; compound A contained 74% quaternary ammonium compound, of which 92.35% by weight was the dialkyl compound (3.75% being the monoalkyl compound and 3.90% the trialkyl compound).

Each of the examples has been made by the same processing route, unless otherwise stated. This was:

The mixture of the three components A, B and C was heated to and maintained at 70° C. until it was wholly liquid. This premix was then added over a period of 1 minute to stirred water at 70° C. containing 0.10 g NaCl. The volume of water was such as to bring the total composition weight to 400 g. Stirring was continued for 15 minutes, and the resulting mixture allowed to cool to ambient temperatures.

The composition of Examples 1–10 were as shown in the following Table. The weight percentages in this Table are in each case the % by weight of the 100% active ingredient in the final composition. The mole percentages refer to the relative proportions of the active ingredients among themselves:

| Sample No. | 1 | 2 | 3 | 4 | 5 | 6 | 7 | 8 | 9 | 10 |
|---|---|---|---|---|---|---|---|---|---|---|
| A(wt %) | 4.88 | 4.44 | 3.95 | 3.38 | 4.38 | 3.89 | 3.84 | 2.64 | 3.23 | 4.98 |
| B(wt %) | 0.42 | 0.45 | 0.48 | 0.51 | 0.89 | 0.94 | 1.40 | 1.60 | 1.96 | — |
| C(wt %) | 0.70 | 1.11 | 1.57 | 2.11 | 0.73 | 1.17 | 0.77 | 1.76 | 0.81 | 1.02 |
| Total wt % of active ingredients | 6.00 | 6.00 | 6.00 | 6.00 | 6.00 | 6.00 | 6.00 | 6.00 | 6.00 | 6.00 |
| A(mole %) | 70 | 60 | 50 | 40 | 60 | 50 | 50 | 30 | 40 | 70 |
| B(mole %) | 10 | 10 | 10 | 10 | 20 | 20 | 30 | 30 | 40 | — |

-continued

| Sample No. | 1 | 2 | 3 | 4 | 5 | 6 | 7 | 8 | 9 | 10 |
|---|---|---|---|---|---|---|---|---|---|---|
| C(mole %) | 20 | 30 | 40 | 50 | 20 | 30 | 20 | 40 | 20 | 30 |

Samples 1-8 and 10 were stable liquid products. Sample 9 separated because it was too thin. It was nevertheless included in some of the softening tests.

The superior softening properties of these mixtures was shown by the following tests.

Compositions 1-4 and a commercial rinse conditioner based solely on di(hardened tallow) dimethyl ammoniumchloride were dispersed in demineralised water to give dilute aqueous dispersions containing 0.01% of the active ingredients in each case. Three pieces of clean cotton towelling (40 g) were rinsed in a Tergotometer pot with 800 ml of the aqueous dispersion at ambient temperatures for 10 minutes, followed by spin-drying and drying in a hot air cabinet.

This rinsing process using the five compositions was carried out in a series of Tergotometer pots, with each of the compositions used 4 times according to a balanced statistical design.

The resulting cloth pieces were assessed for relative softness in ranking order by a panel of 5 people. Rankings were confined to each Tergotometer run (containing 4 compositions in 4 pots).

The average rankings for the 5 formulations are shown below (lower ranking=better softness):

| Example No. | Average Ranking |
|---|---|
| 1 | 2.97 |
| 2 | 2.15 |
| 3 | 1.53 |
| 4 | 2.20 |
| control | 3.65 |

The superior softening of the compositions over the control can clearly be seen.

TEST 2

In this test compositions 5, 7 and 9 were compared with a control containing only di(hardened tallow) dimethyl ammoniumchloride, and a formulation 10 containing A and C but no B. The test was carried out in water of hardness 24° (French). The average ranking obtained among the five products was:

| Example No. | Average Ranking |
|---|---|
| 5 | 2.57 |
| 7 | 2.17 |
| 9 | 2.38 |
| 10 | 1.90 |
| control | 3.48 |

The superior softening of the compositions can again be seen.

TEST 3

In this test compositions 6 and 8 were compared with the control under the same conditions as tests 1 and 2. The average softness rankings obtained were:

| Example No. | Average Ranking |
|---|---|
| 6 | 1.69 |
| 8 | 1.58 |

-continued

| Example No. | Average Ranking |
|---|---|
| control | 2.73 |

Again the superior softening is demonstrated.

TESTS 4 AND 5

This test demonstrates the advantage of having a triple rather than a double active system, particularly in rinses where a substantial amount of anionic detergent has been carried over from the wash. Test 4 shown below was carried out with dispersions containing 0.005% of the active ingredients to which had been added 0.002% of calcium dodecyl benzene sulphonate. Test 5 was carried out in idential fashion but without the calcium dodecylbenzene sulphonate.

| Example No. | Average Ranking Ca DOBS added | Change in Ranking after adding Anionic |
|---|---|---|
| 10 | 2.88 | +1.06 |
| 5 | 2.40 | 0 |
| 7 | 2.22 | −0.48 |
| 9 | 2.30 | −0.52 |
| control | 2.70 | −0.07 |

Formulations 5, 7 and 9 contain added B. In the presence of Ca dodecylbenzene sulphonate these triple active formulations produce better softening than the control. In contrast formulation 10 (a double active system) performs very well under clean conditions but slightly worse than the control in the presence of anionic detergent.

EXAMPLES 11-14

Five formulations were made in the manner described previously but containing a commercial behenic acid in place of the hardened tallow fatty acid. This fatty acid has the chain length distribution: (percentages)

| $C_{16}$ | $C_{18}$ | $C_{20}$ | $C_{22}$ | $C_{24}$ |
|---|---|---|---|---|
| 0.9 | 22.3 | 12.4 | 63.7 | 0.7 |

The formulations of these Examples were:

| Sample No. | 11 | 12 | 13 | 14 |
|---|---|---|---|---|
| A(wt %) | 4.80 | 3.81 | 3.77 | 4.64 |
| B(wt %) | 0.42 | 0.45 | 1.37 | 0.70 |
| Behenic Acid (wt %) | 0.78 | 1.74 | 0.86 | 0.00 |
| Total wt % of active | 6.00 | 6.00 | 6.00 | 6.00 |
| A(mole %) | 70 | 50 | 50 | 66⅔ |
| B(mole %) | 10 | 10 | 30 | 16⅔ |
| Behenic Acid (mole %) | 20 | 40 | 20 | 16⅔ |

These four Examples were then tested for softness against a di(hardened tallow) dimethyl ammoniumchloride control in the manner and conditions described in Test 2. The results were as shown below:

| Example No. | Average Ranking |
|---|---|
| 11 | 2.33 |
| 12 | 2.90 |
| 13 | 2.17 |
| 14 | 1.78 |
| control | 3.32 |

Superior softening is again demonstrated.

EXAMPLES 15-18

A further five formulations were made in the manner described previously, but containing the following compound (D)

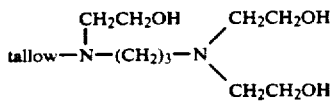

in place of the $C_{18}$-trimethyl ammoniumchloride (B). The formulations of these Examples were:

| Sample No. | 15 | 16 | 17 | 18 |
|---|---|---|---|---|
| A(wt %) | 4.96 | 4.02 | 4.06 | 3.59 |
| D(wt %) | 0.29 | 0.37 | 1.13 | 1.34 |
| C(wt %) | 0.74 | 1.61 | 0.81 | 1.06 |
| Total wt % of active | 6.00 | 6.00 | 6.00 | 6.00 |
| A(mole %) | 70 | 50 | 50 | 66⅔ |
| D(mole %) | 10 | 10 | 30 | 16⅔ |
| C(mole %) | 20 | 40 | 20 | 16⅔ |

Formulations 15-18 were compared in a softening test with a control based solely on di(hardened tallow) dimethyl ammoniumchloride. The conditions were exactly as outlined in softness Test 2. The average softness rankings obtained for these five formulations were as shown below:

| Example No. | Average Ranking |
|---|---|
| 15 | 2.78 |
| 16 | 2.33 |
| 17 | 2.35 |
| 18 | 1.97 |
| control | 3.22 |

The superior softening of the mixed active formulations over the control is evident.

EXAMPLES 19-21

Three products werd made from A and stearic acid (E).

| Example | Weight of A | Weight of Stearic Acid | A/Stearic Acid Mole Ratio | Percent Active |
|---|---|---|---|---|
| 19 | 19.61 | 4.98 | 5/1 | 4 |
| 20 | 22.40 | 2.84 | 3/1 | 4 |
| 21 | 23.75 | 1.81 | 1.5/1 | 4 |

A premix of A and stearic acid was made at 70° C. and added slowly to demineralised water at the same temperature. Stirring was continued for 15 min. and the formulation weight taken to 500 g.

A Tergotometer test was carried out in London hard (24° hardness) water containing 0.005% of active ingredients. Two controls were included in the three test formulations: di(hardened tallow) dimethyl ammoniumchloride and dicoco dimethyl ammoniumchloride. The softness results expressed as average rankings were as follows:

| Product | Ranking |
|---|---|
| di(hardened tallow) dimethyl ammoniumchloride | 2.77 |
| dicoco dimethyl ammonium-chloride | 3.60 |
| 19 | 2.32 |
| 20 | 1.45 |
| 21 | 2.37 |

EXAMPLES 22-27

Three compositions 22-24, containing fatty acids, were made by the following procedure:

27.2 g of A and 4.88 g of C were melted together at 55° C. until a clear homogeneous liquid was obtained. This clear liquid was then poured into a stirred vessel containing 467.92 g of distilled water at 55° C. containing:

for product 22-0 g NaCl
for product 23-0.4 g NaCl
for product 24-0.08 g NaCl

Stirring was continued for 10 minutes at which point the resulting dispersions were set on one side and allowed to cool to room temperature.

Another three compositions 25-27, containing however a soap instead of fatty acids, were made by an identical procedure except that the active premix contained 26.78 g of A, 5.18 g of sodium stearate, with 2 g of isopropyl alcohol and 2 g of water, to aid the production of a clear homogeneous premix. The clear premix was added to 464.04 g of distilled water at 55° C. containing the same quantities of NaCl.

The 6 products 22-27, all 5% total active, 2/1 cationic/anionic mole ratio with 0, 0.08% and 0.16% NaCl were observed over a period of 2 weeks.

The results obtained are tabulated below:

| Formulation | % NaCl | Stability after 2 weeks |
|---|---|---|
| 5% 22 | 0 | stable - no separation |
| 5% 23 | 0.08 | " |
| 5% 24 | 0.16 | " |
| 5% 25 | 0 | " |
| 5% 26 | 0.08 | separated into 2 layers |
| 5% 27 | 0.16 | " |

It can be seen that the products of the invention can tolerate NaCl up to 0.16% without any deleterious effect on stability. The same is not true of the soap-containing products.

EXAMPLES 28-31

Four products 28-31 were made from the following raw materials. The composition of these 4 Examples is shown in the table below. The weight percentages in this table are in each case the % by weight of the 100% active ingredient in the final composition.

| | Product composition in % by weight | | | |
|---|---|---|---|---|
| Ingredients | 28 | 29 | 30 | 31 |
| A(79.4% active) | 2.96 | 2.99 | 2.96 | 2.99 |

-continued

| Ingredients | Product composition in % by weight | | | |
|---|---|---|---|---|
| | 28 | 29 | 30 | 31 |
| Di(coco)dimethyl ammonium-chloride (79.4% active) | 0.60 | 0.30 | — | — |
| C(100% active) | 0.48 | 0.72 | 0.48 | 0.72 |
| $C_{16}$-trimethylammonium-chloride (47.7% active) | — | — | 0.60 | 0.30 |

These four products were made by the following method. The mixture of the 3 components was heated to and maintained at 60° C. until wholly liquid. This premix was added to stirred deionised water at 60° C. The volume of water was such as to bring the total composition weight to 500 g. Stirring was continued for 10 minutes.

All samples were stable liquid products.

The softness performance of these 4 formulations was compared with that of a commercial rinse conditioner based solely on di(hardened tallow) dimethyl ammoniumchloride. (The method of testing is that described on page 8 of the specification except that the aqueous dispersions contained 0.015% of active ingredients.)

The average rankings for the 5 formulations were as shown below:

| Product | Average ranking |
|---|---|
| 28 | 2.43 |
| 29 | 1.73 |
| 30 | 2.73 |
| 31 | 2.03 |
| control | 3.57 |

The superior softening of all the mixed active formulations is clearly seen.

EXAMPLES 32-37

Six compositions 32-37 were made, four of which contained a cationic polymer. These polymers were:

E-a cationic guar gum, known under the tradename Gendriv 162 from General Mills Corp.

F-a dextran of MWt ~ 500,000 substituted with diethyl aminoethyl groups to give 3.2% N in the molecule.

G-a hydroxyethyl cellulose of MWt ~ 400,000 quaternised with 2,3-epoxypropyl trimethylammoniumcloride or 3-chloro-2-hydroxypropyl trimethylammoniumchloride.

These polymers were included in products based on the raw materials

A (74% active)

C (100% active)

The compositions of the products containing these polymers and the controls are shown below:

| Product No. Ingredient (% by weight) | 32 | 33 | 34 | 35 | 36 | 37 |
|---|---|---|---|---|---|---|
| A | 4.0 | 4.0 | 4.0 | 4.0 | 4.32 | 4.32 |
| C | 1.0 | 1.0 | 1.0 | 1.0 | 0.68 | 0.68 |
| E | — | 0.2 | — | — | — | — |
| F | — | — | 0.2 | — | — | — |
| G | — | — | — | 0.2 | — | 0.2 |

These examples were made by the following method. A and C were heated to and maintained at 65° C. until wholly liquid. This premix was added to 300 ml stirred deionised water at 65° C. Immediately afterwards a solution/dispersion of the polymer in 100 ml of deionised water was added, followed by sufficient water to bring the total composition weight to 500 g. Stirring was continued for 10 minutes.

The softness performance of formulations 32-35 was compared with that of a commercial rinse conditioner based solely on di(hardened tallow) dimethyl ammoniumchloride. (The method is the same as that described on page 8 except that aqueous dispersions contained 0.01% of active ingredients and 0.002% of added sodium dodecylbenzenesulphonate.) The average rankings in this test were

| Product | Average ranking |
|---|---|
| 32 | 3.27 |
| 33 | 2.17 |
| 34 | 2.90 |
| 35 | 2.45 |
| control | 2.12 |

It can be seen that the presence of polymer has greatly improved softness performance in the presence of anionic detergent carryover. (product 33-35 vs 32).

Under identical conditions the performance of formulations 36 and 37 was compared with a control. The results are shown below

| Formulation | Average ranking |
|---|---|
| 36 | 2.38 |
| 37 | 1.64 |
| control | 1.98 |

I claim:

1. A fabric softening composition consisting essentially of an aqueous liquid containing from 20-95 mole % of a relatively water-insoluble cationic detergent surfactant having two $C_{12}$-$C_{22}$ alkyl-or alkenyl groups, and from 5-80 mole % of a free $C_8$-$C_{24}$ alkyl-or alkenylmonocarboxylic acid, the total amount of cationic detergent surfactant plus alkyl- or alkenylmonocarboxylic acid being from 2-20% by weight of the aqueous liquid, the composition having a pH of 5 or less.

2. A composition according to claim 1, consisting essentially of from 40-80 mole % of the cationic detergent surfactant and from 10-40 mole % of the alkyl- or alkenylmonocarboxylic acid.

3. A composition according to claim 1, wherein the cationic detergent surfactant contains two $C_{16}$-$C_{18}$ alkyl-or alkenyl groups.

4. A composition according to claim 1, wherein the alkylmonocarboxylic acids are the hardened tallow $C_{16}$-$C_{18}$ saturated fatty acids.

5. A composition according to claim 1, further consisting essentially of up to 50 mole % of a relatively water-soluble cationic detergent surfactant having a quaternary ammonium group and only one $C_{10-24}$ alkyl group. group.

6. A composition according to claim 5, consisting essentially of from 5-30 mole % of the relatively water-soluble cationic detergent surfactant.

7. A composition according to claim 1, further comprising a cationic polymer selected from the group consisting of cationic polysaccharide gums, cationic starch, cationic polyvinyl alcohol, cationic polyvinylpyrrolidone, quaternized dextrans, quaternized hydroxy ethyl cellulose, cationic guar gum, and copolymers of dialkylamino alkylmethacrylate.

8. A composition according to claim 7, wherein the cationic polymer is a cationic guar gum, a quaternized dextran or a quaternized hydroxyethylcellulose.

9. A process for preparing aqueous compositions of claim 1, comprising premixing the cationic detergent surfactant and the alkyl- or alkenylmonocarboxylic acid, heating the resulting premix until it becomes clear, and adding the resulting, clear premix to water with stirring.

10. A method for softening fabrics comprising treating said fabrics with the composition of any of claims 1 to 6, 8 or 7.

*11. A fabric softening composition in the form of an aqueous dispersion consisting essentially of*

*(a) from 17.4% to 19.1% of a water-insoluble cationic fabric softener and*

*(b) from 0.9% to 2.6% of a viscosity control agent selected from the group consisting of $C_9$–$C_{24}$ fatty acids and mixtures thereof,*

*wherein the ratio of (a) to (b) is from 6.7:1 to 21.2:1, the total of (a) and (b) is between 2 and 20%, and the pH of the composition is 5 or less.*

*12. A composition according to claim 11 wherein the fabric softener is from 17.9% to 19.1% of a di-$C_{12}$–$C_{22}$ alkyl imidazolinium salt.*

*13. A composition according to claim 12 wherein the imidazolinium salt has the formula:*

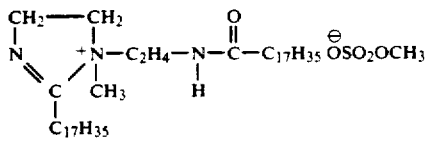

*14. A composition according to claim 13 where the ratio of (a) to (b) is from 8.5:1 to 21.2:1.*

*15. A composition according to claim 14 additionally consisting essentially of from 800 to 1600 ppm. of electrolyte.*

*16. A composition according to claim 15 additionally consisting essentially of up to 5% of a water-insoluble non-ionic softener.*

*17. A fabric softening composition in the form of an aqueous dispersion consisting essentially of*

*(a) from 16.4% to 19.1% of a water-insoluble cationic fabric softener and*

*(b) from 0.9 to 3.6% of a viscosity control agent selected from the group consisting of $C_9$–$C_{24}$ fatty acids and mixtures thereof,*

*wherein the ratio of (a) to (b)* is from 4.6:1 to 21.2:1, the total of *(a) and (b) is between 2 and 20%, and the pH of the composition is 5 or less.*

*18. A fabric softening composition in the form of an aqueous dispersion consisting essentially of*

*(a) 17.8% of a water-insoluble cationic fabric softener which is di(hardened tallow) dimethyl ammonium chloride and*

*(b) 2.2% of a viscosity control agent which is hardened tallow fatty acids,*

*wherein the ratio of (a) to (b) is 8.1:1 and the pH of the composition is 5 or less.*

*19. A fabric softening composition in the form of an aqueous dispersion consisting essentially of*

*(a) 17.4% of a water-insoluble cationic fabric softener which is di(hardened tallow) dimethyl ammonium chloride and*

*(b) 2.6% of a viscosity control agent which is behenic acid,*

*wherein the ratio of (a) to (b) is 6.7:1 and the pH of the composition is 5 or less.*

*20. A fabric softening composition in the form of an aqueous dispersion consisting essentially of*

*(a) 18.3% of a water-insoluble cationic fabric softener which is a 2-heptadecyl-1-methylstearoyl amido ethyl imidazoline methosulphate salt and*

*(b) 1.7% of a viscosity control agent which is hardened tallow fatty acids,*

*wherein the ratio of (a) to (b) is 10.8:1 and the pH of the composition is 5 or less.*

*21. A composition according to claim 20 wherein the imidazolinium salt has the formula:*

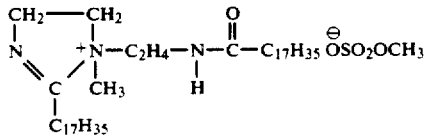

*22. A composition according to claim 21 wherein the ratio of (a) to (b) is 10.8:1.*

*23. A composition according to claim 22 additionally consisting essentially of 800 ppm. of sodium chloride.*

*24. A composition according to claim 22 additionally consisting essentially of up to 5% of glycerol monostearate.*

*25. A fabric softening composition in the form of an aqueous dispersion consisting essentially of*

*(a) 17.9% or 18.9% of a water-insoluble cationic fabric softener which is a 2-heptadecyl-1-methylstearoyl amido ethyl imidazoline methosulphate salt and*

*(b) 1.1% or 2.1% of a viscosity control agent which is behenic acid,*

*wherein the ratio of (a) to (b) is 8.5:1 or 17.2:1 and the pH of the composition is 5 or less.*

*26. A composition according to claim 25 wherein the imidazolinium salt has the formula:*

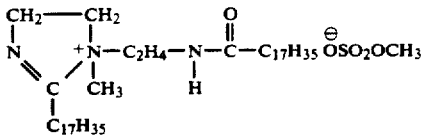

*27. A composition according to claim 26 wherein the ratio of (a) to (b) is 8.5:1.*

*28. A composition according to claim 27 additionally consisting essentially of 800 ppm. of sodium chloride.*

*29. A composition according to claim 28 additionally consisting essentially of up to 5% glycerol monostearate.*

*30. A fabric softening composition in the form of an aqueous dispersion consisting essentially of*

*(a) 18.3% or 19.1% of a water-insoluble cationic fabric softener which is di-$C_{12}$ alkyl or alkenyl mono-quaternary ammonium salt and*

*(b) 0.9% or 1.7% of a viscosity control agent which is $C_9$ fatty acid,*

*wherein the ratio of (a) to (b) is 4.6:1 or 9.1, the total of (a) and (b) is between 2 and 20% and the pH of the composition is 5 or less.*

*31. A fabric softening composition in the form of an aqueous dispersion consisting essentially of*

*(a) 16.4% or 18.0% of a water-insoluble cationic fabric softener which is di-$C_{12}$ alkyl or alkenyl mono-quaternary ammonium salt and*

*(b) 2.0% or 3.6% of a viscosity control agent which is $C_{24}$ fatty acid,*

*wherein the ratio of (a) to (b) is 4.6:1 or 9.1, the total of (a) and (b) is between 2 and 20% and the pH of the composition is 5 or less.*

*32. A fabric softening composition in the form of an aqueous dispersion consisting essentially of*

*(a) 18.9% of a water-insoluble cationic fabric softener which is di-$C_{12}$ alkyl or alkenyl mono-quaternary ammonium salt and*

*(b) 1.1% of a viscosity control agent which is $C_9$ fatty acid,*

*wherein the ratio of (a) to (b) is 17.2:1 and 20% and the pH of the composition is 5 or less.*

*33. A fabric softening composition in the form of an aqueous dispersion consisting essentially of*

*(a) 17.7 or 18.8% of a water-insoluble cationic fabric softener which is di-$C_{22}$* alkyl or alkenyl mono-*quaternary ammonium salt and*

*(b) 1.2% or 2.3% of a viscosity control agent which is $C_9$ fatty acid,*

*wherein the ratio of (a) to (b) is 7.7:1 or 15.7:1, the total of (a) and (b) is between 2 and 20% and the pH of the composition is 5 or less.*

*34. A fabric softening composition in the form of an aqueous dispersion consisting essentially of*

*(a) 18.9% of a water-insoluble cationic fabric softener which is di(hardened tallow) dimethyl ammonium chloride and*

*(b) 1.1% of a viscosity control agent which is hardened tallow fatty acids,*

*wherein the ratio of (a) to (b) is 17.2:1 and the pH of the composition is 5 or less.*

*35. A fabric softening composition in the form of an aqueous dispersion consisting essentially of*

*(a) 18.6% of a water-insoluble cationic fabric softener which is di(hardened tallow) dimethyl ammonium chloride and*

*(b) 1.4% of a viscosity control agent which is behenic acid,*

*wherein the ratio of (a) to (b) is 13.3:1 and the pH of the composition is 5 or less.*

*36. A fabric softening composition in the form of an aqueous dispersion consisting essentially of*

*(a) 19.1% of a water-insoluble cationic fabric softener which is a 2-heptadecyl-1-methylstearoyl amido ethyl imidazoline methosulphate salt and*

*(b) 0.9% of a viscosity control agent which is hardened tallow fatty acids,*

*wherein the ratio of (a) to (b) is 21.2:1 and the pH of the composition is 5 or less.*

* * * * *